Figures 1, 2:
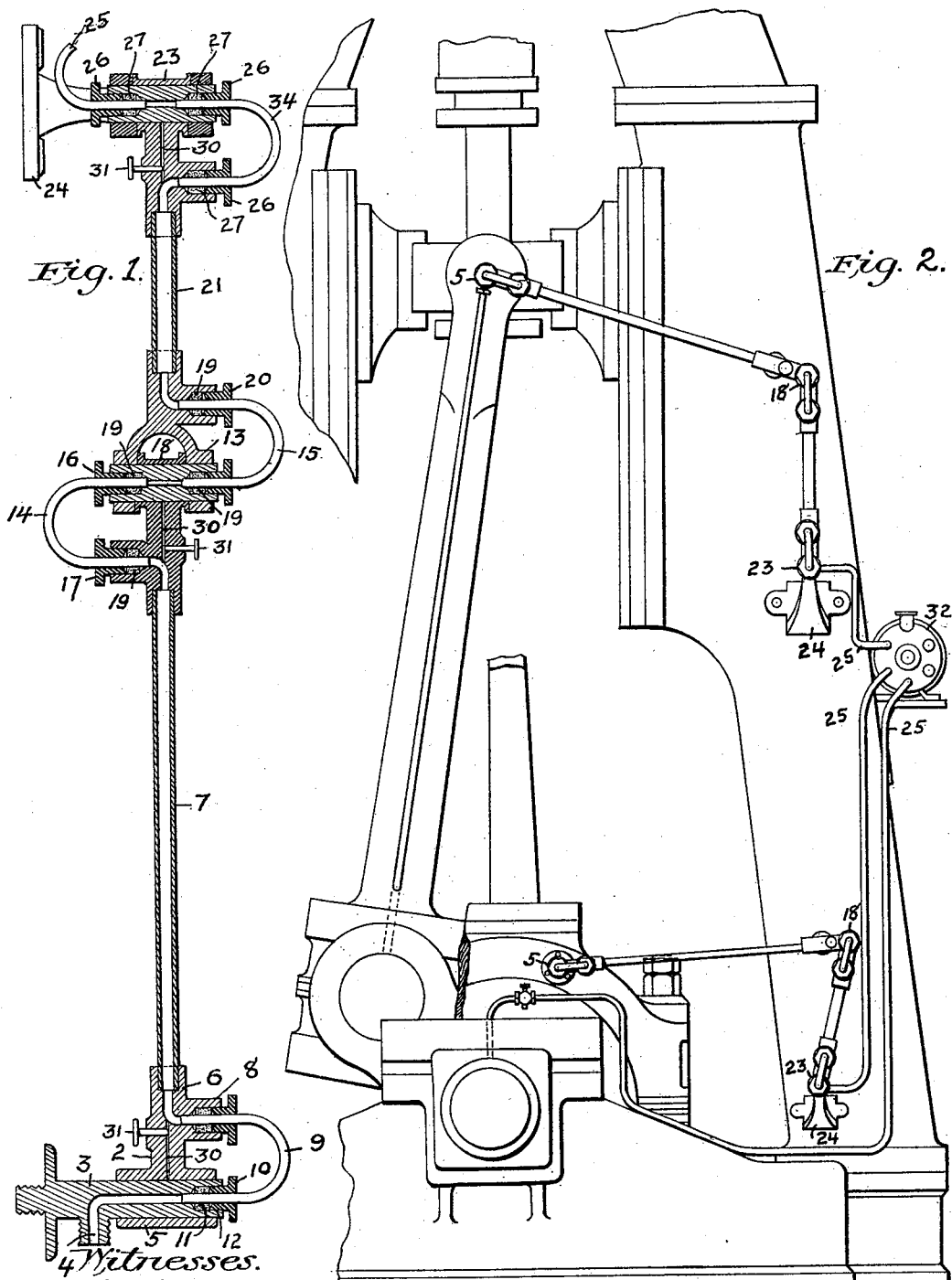

(No Model.)

W. H. & R. THOMPSON.
LUBRICATOR.

No. 589,449. Patented Sept. 7, 1897.

Witnesses.
Ch. Wilson
C. J. Rathjen

Inventors.
William Henry Thompson
Robert Thompson
by Gifford & Bull Attys.

UNITED STATES PATENT OFFICE.

WILLIAM HENRY THOMPSON AND ROBERT THOMPSON, OF LONDON, ENGLAND.

LUBRICATOR.

SPECIFICATION forming part of Letters Patent No. 589,449, dated September 7, 1897.

Application filed October 31, 1896. Serial No. 610,713. (No model.) Patented in England June 1, 1893, No. 10,770; in France May 23, 1894, No. 238,743, and in Belgium May 28, 1894, No. 110,179.

*To all whom it may concern:*

Be it known that we, WILLIAM HENRY THOMPSON and ROBERT THOMPSON, subjects of the Queen of Great Britain, and residents of London, in the county of Middlesex, England, have invented certain new and useful Improvements in Lubricators, of which the following is a specification.

Our present invention (patented in Great Britain June 1, 1893, No. 10,770; in France May 23, 1894, No. 238,743, and in Belgium May 28, 1894, No. 110,179) relates to lubricators; and it consists of certain novel parts and combinations of parts particularly pointed out in the claims concluding this specification.

In lubricating devices heretofore constructed oil has been fed to a remoter bearing after passing in contact with a bearing nearer the supply-reservoir. In such a contrivance excessive leakage of the lubricant results and is being constantly increased as the parts wear. Furthermore, the amount of oil supplied to different bearings cannot be independently varied or controlled.

By the devices herein illustrated and described the lubricant is conducted past a nearer to a remoter bearing through a continuous duct which does not communicate with any intermediate bearing-surface except by a branch passage which may be controlled by a valve. In such a device there is no undue leakage, while the amount of oil supplied to each bearing is under the control of the operator and can be varied independently and at will. Furthermore, by such flexible oil-duct one or more moving joints may be automatically lubricated from a stationary reservoir, as shown in Figure 2.

In the accompanying drawings, Figure 1 is a longitudinal section through a part of an engine to which our lubricating device is applied; and Fig. 2 is a side view of the same and some of the attendant parts, showing a plurality of moving joints automatically lubricated by means of the flexible oil-ducts herein described from a stationary oil-reservoir.

The following is a description of the structure illustrated in the drawings which embody our invention in the form which is at present preferred by us; but it will be understood that various modifications and changes may be made without departing from the spirit of our invention and without exceeding the scope of the concluding claims, and that our invention is applicable to other parts of an engine and may be applied to any form of structure in which there are a plurality of bearings to be lubricated.

2 is a joint for connection with the cross-head of an engine, which joint is formed with a pin 3, (hereinafter called the "hollow pin,") which pin is formed with a passage 4 and screw and flange for connection with the cross-head pin and pipe conducting the lubricant to the crank-pin, as shown at Fig. 1.

The socket 5, working on the hollow pin 3, is formed with connections 6 for connection with 7 and 8 for holding firmly a branch pipe 9, continuing the passage from pipe 7 to the central passage of the hollow pin, where it is sealed and held by the gland 10 and the packing 11 in the stuffing-box 12, so as to prevent leakage and at the same time admit of its free movement or radiation with the pipe 7, which is continued to the intermediate joint 13, the hollow pin of which is formed with a stuffing-box at each end, to which the branch pipes 14 15 are continued from the connections 16 17, formed with a socket 18 and fork-bearings 13, in which the hollow pin is set after being passed through the socket, so as to hold and operate with it, while the branch pipes 15 15, being sealed and held by the packing 19 and gland 16, 17, and 20, form a free passage for the lubricant from pipe 7 to pipe 21, which is continued to and compound with the fixed joint 23, and the hollow pin of which, passing through the socket, is set into and carried by the bracket 24, so as to form the fixed bearing on which the flexible pipe formed by the joints 23, 18, and 5 radiates, the branch pipe being arranged in combination with the hollow pin, as in 18, while its passage is continued and connected to the stationary pipe 25, (by the gland 26 and packing 27,) which is connected with the stationary lubricator, from which it conducts the lubricant to the flexible or jointed pipe, through which it continues its passage to the hollow pin at the crosshead, and from thence through pin leading to the crank for its lubrication, as shown in Fig. 1, the sockets 23, 18, and 5 being lubricated by the diversion of a minute quantity of the lubricant through the passages 30, the flow of which is regulated by the adjustment of the regulating-screw 31.

The reservoir 32 may be formed with any required number of outlets for conducting the lubricant to other bearing-surfaces of the machinery, and the joints may be arranged or modified so as to adapt them to the moving bearings of various kinds of machinery without departing from the true principle of the invention.

What we claim is—

1. The combination with a lubricator and parts to be lubricated of a connecting-duct formed in part by hollow pivoted rods, a hollow crank-pin by which said rods are joined together, and suitable jointed or flexible connections communicating between the ducts formed in the hollow rods and the ends of said crank-pin, whereby the lubricating fluid is conducted through said crank-pin without communicating with the bearing-surfaces thereof.

2. The combination with a lubricator and parts to be lubricated of a connecting-duct formed in part by hollow pivoted rods, a hollow crank-pin by which said rods are joined together, and suitable jointed or flexible connections communicating between the ducts formed in the hollow rods and the ends of said crank-pin, whereby the lubricating fluid is conducted through said crank-pin without communicating with the bearing-surfaces thereof and a valve-controlled branch leading from said duct to said bearing-surfaces.

WILLIAM HENRY THOMPSON.
ROBERT THOMPSON.

Witnesses:
   E. R. A. BENNETT,
   WILLIAM ATKINSON.